US011562147B2

(12) United States Patent
Wang et al.

(10) Patent No.: US 11,562,147 B2
(45) Date of Patent: Jan. 24, 2023

(54) UNIFIED VISION AND DIALOGUE TRANSFORMER WITH BERT

(71) Applicant: salesforce.com, inc., San Francisco, CA (US)

(72) Inventors: Yue Wang, Singapore (SG); Chu Hong Hoi, Singapore (SG); Shafiq Rayhan Joty, Singapore (SG)

(73) Assignee: Salesforce.com, Inc., San Francisco, CA (US)

( * ) Notice: Subject to any disclaimer, the term of this patent is extended or adjusted under 35 U.S.C. 154(b) by 187 days.

(21) Appl. No.: 16/929,738

(22) Filed: Jul. 15, 2020

(65) Prior Publication Data

US 2021/0232773 A1 Jul. 29, 2021

Related U.S. Application Data

(60) Provisional application No. 62/964,806, filed on Jan. 23, 2020.

(51) Int. Cl.
*G06F 40/30* (2020.01)
*G06F 21/36* (2013.01)
(Continued)

(52) U.S. Cl.
CPC .......... *G06F 40/35* (2020.01); *G06F 40/284* (2020.01); *G06K 9/6217* (2013.01); *G06N 3/08* (2013.01)

(58) Field of Classification Search
CPC ........ G06F 40/30; G06F 40/205; G06F 21/36; G06F 3/0482
See application file for complete search history.

(56) References Cited

U.S. PATENT DOCUMENTS 9,131,510 B2 9/2015 Wang
9,380,515 B2 6/2016 Wang et al.
(Continued)

FOREIGN PATENT DOCUMENTS

CA 3040165 A1 * 5/2018 ............. G06F 40/30
CN 11020989 A * 9/2019
(Continued)

OTHER PUBLICATIONS

Das et al., "Visual Dialog", 2017, Proceedings of the IEEE Conference on Computer Vision and Pattern Recognition (CVPR), pp. 326-335 (Year: 2017).*
(Continued)

*Primary Examiner* — Shreyans A Patel
(74) *Attorney, Agent, or Firm* — Haynes and Boone LLP

(57) ABSTRACT

A visual dialogue model receives image input and text input that includes a dialogue history between the model and a current utterance by a human user. The model generates a unified contextualized representation using a transformer encoder network, in which the unified contextualized representation includes a token level encoding of the image input and text input. The model generates an encoded visual dialogue input from the unified contextualized representation using visual dialogue encoding layers. The encoded visual dialogue input includes a position level encoding and a segment type encoding. The model generates an answer prediction from the encoded visual dialogue input using a first self-attention mask associated with discriminative settings or a second self-attention mask associated with generative settings. Dense annotation fine tuning may be performed to increase accuracy of the answer prediction. The model provides the answer prediction as a response to the current utterance of the human user.

18 Claims, 12 Drawing Sheets

(51) Int. Cl.
  *G06F 40/35* (2020.01)
  *G06N 3/08* (2006.01)
  *G06F 40/284* (2020.01)
  *G06K 9/62* (2022.01)

(56) References Cited

U.S. PATENT DOCUMENTS

| | | | |
|---|---|---|---|
| D794,059 S | 8/2017 | Ekstrand et al. | |
| 10,282,663 B2 | 5/2019 | Socher et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |
| 10,573,295 B2 | 2/2020 | Zhou et al. | |
| 10,592,767 B2 | 3/2020 | Trott et al. | |
| 10,699,060 B2 | 6/2020 | McCann | |
| 10,747,761 B2 | 8/2020 | Zhong et al. | |
| 10,776,581 B2 | 9/2020 | McCann et al. | |
| 10,783,875 B2 | 9/2020 | Hosseini-Asl et al. | |
| 2015/0356199 A1* | 12/2015 | Mei | G06F 16/58 |
| | | | 707/728 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0268287 A1 | 9/2018 | Johansen et al. | |
| 2018/0268298 A1 | 9/2018 | Johansen et al. | |
| 2018/0300312 A1* | 10/2018 | Rai | G06N 7/005 |
| 2018/0336453 A1 | 11/2018 | Merity et al. | |
| 2018/0373682 A1 | 12/2018 | McCann et al. | |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0355270 A1 | 11/2019 | McCann et al. | |
| 2019/0362020 A1 | 11/2019 | Paulus et al. | |
| 2020/0005765 A1 | 1/2020 | Zhou et al. | |
| 2020/0057805 A1 | 2/2020 | Lu et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175148 A1* | 6/2020 | Toor | H04L 67/01 |
| 2020/0175305 A1 | 6/2020 | Trott et al. | |
| 2020/0184020 A1 | 6/2020 | Hashimoto et al. | |
| 2020/0226475 A1* | 7/2020 | Ma | G06F 40/35 |
| 2020/0234113 A1 | 7/2020 | Liu | |
| 2020/0258498 A1* | 8/2020 | Reisswig | G06F 40/30 |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285878 A1* | 9/2020 | Wang | G06K 9/6201 |
| 2020/0285993 A1 | 9/2020 | LIU et al. | |
| 2020/0302178 A1 | 9/2020 | Gao et al. | |
| 2020/0302236 A1 | 9/2020 | Gao et al. | |
| 2020/0319860 A1* | 10/2020 | Arat | G16H 80/00 |
| 2021/0082398 A1* | 3/2021 | Hori | G10L 15/02 |
| 2021/0232773 A1* | 7/2021 | Wang | G06V 10/774 |

FOREIGN PATENT DOCUMENTS

| | | | | |
|---|---|---|---|---|
| CN | 110209898 A | * | 9/2019 | |
| KR | 102352128 B1 | * | 1/2019 | |
| KR | 102352128 B1 | * | 11/2019 | G06F 40/30 |

OTHER PUBLICATIONS

Antol et al. 2015. VQA: visual question answering. In 2015 IEEE International Conference on Computer Vision, ICCV 2015, Santiago, Chile, Dec. 7-13, 2015, pp. 2425-2433.

Bahdanau, et al. 2015. Neural machine translation by jointly learning to align and translate. In 3rd Inter-national Conference on Learning Representations, ICLR 2015, San Diego, CA, USA, May 7-9, 2015, Conference Track Proceedings.

Cao et al. 2007. Learning to rank: from pairwise approach to listwise approach. In Machine Learning, Proceedings of the Twenty-Fourth International Conference (ICML 2007), Corvallis, Oregon, USA, Jun. 20-24, 2007, vol. 227 of ACM International Conference Proceeding Series, pp. 129-136. ACM.

Das et al. 2017. Visual dialog. In 2017 IEEE Conference on Computer Vision and Pat-tern Recognition, CVPR 2017, Honolulu, HI, USA, Jul. 21-26, 2017, pp. 1080-1089.

Devlin et al. 2019. BERT: pre-training of deep bidirectional transformers for language understanding. In Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), pp. 4171-4186.

Dong et al. 2019. Unified language model pre-training for natural language understanding and generation. CoRR, abs/1905.03197.

Gan et al. 2019. Multi-step reasoning via recurrent dual attention for visual dialog. In Proceedings of the 57th Conference of the Association for Computational Linguistics, ACL 2019, Florence, Italy, Jul. 28-Aug. 2, 2019, vol. 1: Long Papers, pp. 6463-6474.

Guo et al. 2019. Image-question-answer synergistic network for visual dialog. In IEEE Conference on Computer Vision and Pattern Recognition, CVPR 2019, Long Beach, CA, USA, Jun. 16-20, 2019, pp. 10434-10443.

Kang et al. 2019. Dual attention networks for visual reference resolution in visual dialog. CoRR, abs/1902.09368.

Kingma et. 2015. Adam: A method for stochastic optimization. In 3rd Inter-national Conference on Learning Representations, ICLR 2015, San Diego, CA, USA, May 7-9, 2015, Conference Track Proceedings.

Kottur et al. 2018. Visual coreference resolution in visual dialog using neural module networks. In Computer Vision—ECCV 2018— 15th European Conference, Munich, Germany, Sep. 8-14, 2018, Proceedings, Part XV, pp. 160-178.

Krishna et al. 2017. Visual genome: Connecting language and vision using crowdsourced dense image annotations. International Journal of Computer Vision, 123(1):32-73.

Li et al. 2019a. Unicoder-vl: Auniversal encoder for vision and language by cross-modal pre-training. CoRR, abs/1908.06066.

Li et al. 2019b. Visualbert: A simple and performant baseline for vision and language. CoRR, abs/1908.03557.

Lu et al. 2019. Vilbert: Pretraining task-agnostic visiolinguistic representations for vision- and-language tasks. CoRR, abs/1908.02265.

Lu et al. 2017. Best of both worlds: Transferring knowledge from discriminative learning to a generative visual dialog model. In

(56) References Cited

OTHER PUBLICATIONS

Advances in Neural Information Processing Systems 30: Annual Conference on Neural Information Processing Systems 2017, Dec. 4-9, 2017, Long Beach, CA, USA, pp. 314-324.
Zhou et al. 2019. Unified vision-language pre-training for image captioning and vqa. arXiv preprint arXiv:1909.11059.
Niu et al. 2019. Recursive visual attention in visual dialog. In IEEE Conference on Computer Vision and Pattern Recognition, CVPR 2019, Long Beach, CA, USA, Jun. 16-20, 2019, pp. 6679-6688.
Qin et al. 2010. A general approximation framework for direct optimization of information retrieval measures. Inf. Retr., 13(4):375-397.
Ren et al. 2015. Faster R-CNN: towards real-time object detection with region proposal networks. In Advances in Neural Information Processing Systems 28: Annual Conference on Neural Information Processing Systems 2015, Dec. 7-12, 2015, Montreal, Quebec, Canada, pp. 91-99.
Schwartz et al. 2019. Factor graph attention. In IEEE Conference on Computer Vision and Pattern Recognition, CVPR 2019, Long Beach, CA, USA, Jun. 16-20, 2019, pp. 2039-2048.
Sharma et al. 2018. Conceptual captions: A cleaned, hypernymed, image alt-text dataset for automatic image captioning. In Proceedings of the 56th Annual Meeting of the Association for Computational Linguistics, ACL 2018, Melbourne, Australia, Jul. 15-20, 2018, vol. 1: Long Papers, pp. 2556-2565.
Su et al. 2019. VL-BERT: pre-training of generic visual-linguistic representations. CoRR, abs/1908.08530.
Suhr et al. 2019. A corpus for reasoning about natural language grounded in photographs. In Proceedings of the 57th Conference of the Association for Computational Linguistics, ACL 2019, Florence, Italy, Jul. 28-Aug. 2, 2019, vol. 1: Long Papers, pp. 6418-6428.
Sun et al. 2019. Videobert: A joint model for video and language representation learning. CoRR, abs/1904.01766.
Tan et al. 2019. Lxmert: Learning cross-modality encoder representations from transformers. In Proceedings of the 2019 Conference on Empirical Methods in Natural Language Processing.
Whang et al. 2019. Domain adaptive training BERT for response selection. CoRR, abs/1908.04812.
Wu et al. 2018. Are you talking to me? reasoned visual dialog generation through adversarial learning. In 2018 IEEE Conference on Computer Vision and Pattern Recognition, CVPR 2018, Salt Lake City, UT, USA, Jun. 18-22, 2018, pp. 6106-6115.
Wu, et al. 2016. Google's neural machine translation system: Bridging the gap between human and machine translation. arXiv preprint arXiv:1609.08144.
Xia et al. 2008. Listwise approach to learning to rank: theory and algorithm. In Machine Learning, Proceedings of the Twenty-Fifth International Conference (ICML 2008), Helsinki, Finland, Jun. 5-9, 2008, vol. 307 of ACM International Conference Proceeding Series, pp. 1192-1199. ACM.
Yang et al. 2019. Making history matter: History-advantage sequence training for visual dialog. In Proceedings of the IEEE International Conference on Computer Vision, pp. 2561-2569.
Young et al. 2014. From image descriptions to visual denotations: New similarity metrics for semantic inference over event descriptions. TACL, 2:67-78.
Zheng et al. 2019. Reasoning visual dialogs with structural and partial observations. In IEEE Conference on Computer Vision and Pattern Recognition, CVPR 2019, Long Beach, CA, USA, Jun. 16-20, 2019, pp. 6669-6678.

* cited by examiner

UNIFIED VISION AND DIALOGUE TRANSFORMER WITH BERT

CROSS-REFERENCE TO RELATED APPLICATIONS

This application claims the benefit of U.S. Provisional Patent Application No. 62/964,806, filed on Jan. 23, 2020, entitled "Vision and Dialogue Transformer with BERT for Visual Dialogue," which is incorporated by reference in its entirety.

TECHNICAL FIELD

The present disclosure relates generally to training and use of machine learning systems, and more specifically to, a unified vision and dialogue transformer with BERT for visual dialogue.

BACKGROUND

Artificial intelligence (AI), implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human may make. Neural network models have been shown to outperform and/or have the potential to outperform other computing techniques in a number of applications.

Visual dialogue is one application or task to which neural networks may be applied. In a visual dialogue task, a neural network model or artificial intelligence-based machine agent engages in a natural language dialogue or "conversation" with a human user regarding one or more images. The neural network model or machine agent attempts to answer a human's questions about visual content in a natural conversational manner. Unlike single-turn visual question answering (VQA), the machine agent of visual dialogue is tasked to answer questions through multiple rounds of conversation interactions together with fusing visual content understanding. Thus, visual dialogue can be a very challenging vision-language task in that a dialogue machine agent needs to answer a series of questions through reasoning on the image content and dialogue history.

DETAILED DESCRIPTION

Figure 1:
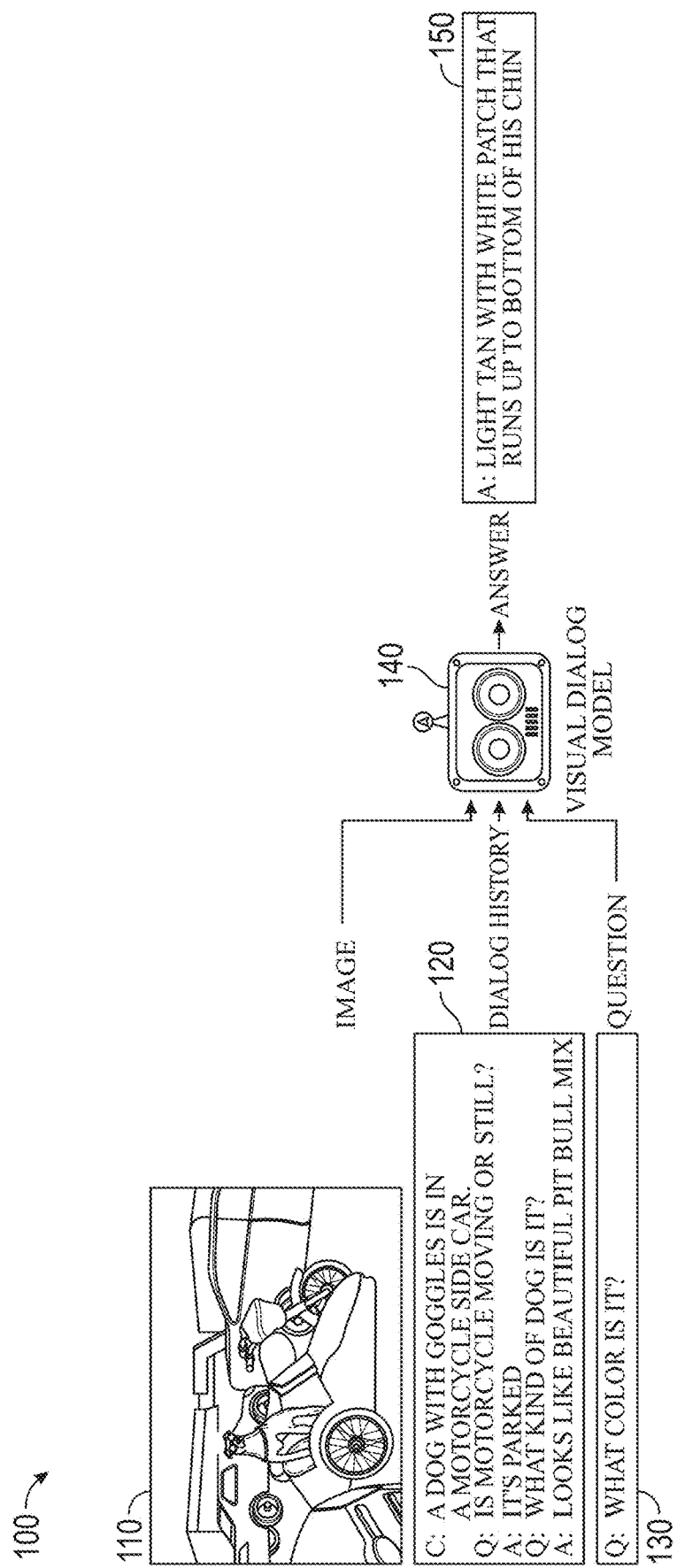
FIG. 1 is a simplified diagram of a workflow with a visual dialogue model, according to some embodiments.

Visual dialogue (VisDial) is a challenging vision-language task. Visual dialogue aims to build an AI-based machine agent that can answer a human's questions about visual content in a natural conversational setting. Unlike traditional single-turn Visual Question Answering (VQA) systems, the machine agent is tasked to answer a series of questions through multiple rounds of conversation interactions together with fusing visual content understanding by reasoning on the image content and dialogue history.

Some prior approaches include BERT for tasks in multi-modal domain. These prior approaches typically include self-supervised objectives to pretrain BERT-like models on large-scale external vision-language data and then fine tune on downstream tasks, yielding mixed results in tasks, such as VQA, visual reasoning, and image retrieval. However, these prior approaches have not shown how visual dialogue may benefit from such vision-language pre-trained models due to its unique multi-turn dialogue structure. Specifically, each image in a visual dialogue dataset is associated with up to 10 dialogue turns, which contains much longer contexts than either VQA or image captioning. Therefore, the subject technology includes the integration of pre-trained language models for the visual dialogue task.

The present disclosure provides systems and methods that implement a unified visual-dialogue transformer-based approach or model that leverages a Bidirectional Encoder Representations from Transformers (BERT) pre-trained language models for visual dialogue tasks. In some embodiments, the subject technology encodes input images and a corresponding multi-turn dialogue history input concurrently using a unified transformer and directly fine-tunes the pre-trained BERT-based model on visual dialogue data for effective fusion of image and dialogue contents. The subject technology can either rank answer candidates or generate answers directly.

Specifically, the subject technology can first encode the image input into a series of detected objects and feed them into a unified transformer encoder together with a corresponding image caption and multi-turn dialogue history input. The subject technology can initialize the unified transformer encoder with BERT for increased leveraging of the pre-trained language representation. To deeply fuse features from the two modalities, the subject technology make use of two visually-grounded pretraining objectives, such as Masked Language Modeling (MLM) and Next Sentence Prediction (NSP), to train the model on the visual dialogue data. In contrast to prior approaches involving MLM and NSP in BERT, the subject technology additionally acquires the visual information into account for predicting a masked token or a next answer. Additionally, the subject technology can employ different self-attention masks inside the unified transformer encoder to support both discriminative and generative settings. During inference, the subject technology can directly either rank the answer candidates according to their respective NSP scores or generate an answer sequence by recursively applying the MLM operation. The ranking results can be further optimized using dense annotations provided by a ranking module.

The subject technology provides that a pre-trained language model, such as BERT, can be effectively adapted to perform vision-language tasks with predetermined fine-tuning for vision and dialogue fusion. The subject technology achieves increased performance metrics in visual dialogue tasks using predetermined discriminative settings and predetermined generative settings against visual dialogue task benchmarks. The subject technology provides several advantageous benefits over the prior approaches in visual dialogue by: 1) supporting both discriminative and generative settings whereas the prior approaches in visual dialogue are restricted to only pretraining with discriminative settings, and 2) not requiring to pretrain on large-scale external vision-language datasets as opposed to the prior approaches with inferior performance metrics. The subject technology can be conducive in performing advantageously with various learning strategies, contexts, and dense annotation fine-tuning, thus facilitating future transfer learning research for visual dialogue.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks, such as supervised or unsupervised neural networks, convolutional neural networks, or memory-augmented neural networks, among others.

FIG. 1 is a simplified diagram of a workflow 100 with a visual dialogue model 140, according to some embodiments. The visual dialogue model 140 can operate with an AI-based machine agent to hold a meaningful dialogue with humans in natural, conversational language about visual content. Specifically, given an image, a dialogue history, and a follow-up question about the image, the task for the machine agent through the visual dialogue model 140 is to answer a human user question. As depicted in FIG. 1, the workflow 100 includes an image 110, a dialogue history 120, a human user question 130, the visual dialogue model 140 and an answer 150. In the workflow 100, the visual dialogue model 140 receives the image 110, the dialogue history 120 and the question 130 as input and generates the answer 150 base on the received input.

Prior approaches have attempted to implement visual dialogue, where a dialogue machine agent is tasked to answer a series of questions grounded by an image (e.g., image 110). It is one of the most challenging vision-language tasks that requires not only for a model to understand the image content according to a text input, but also to reason along a dialogue history (e.g., the dialogue history 120). These prior approaches have included a variety of attention mechanisms to model such interactions among the image 110, question 130, and dialogue history 120. A first prior approach implemented a dual attention module to first refer to relevant contexts in the dialogue history 120, and then find indicative image regions within the image 110. A second prior approach implemented multi-step reasoning to model the interaction between the dialogue history 120 and the image 110. A third prior approach implemented a general attention mechanism that can model the interaction among various utilities, however, its attention modules require to separately operate on any two of utilities. Other approaches have implemented the transformer encoder for handling all the interactions between many utilities, however, their models may not leverage the pretrained language representations from BERT. In contrast to these prior approaches, the subject technology includes self-attention using a transformer encoder to learn a holistic contextualized representation for all these utilities.

Figure 2:
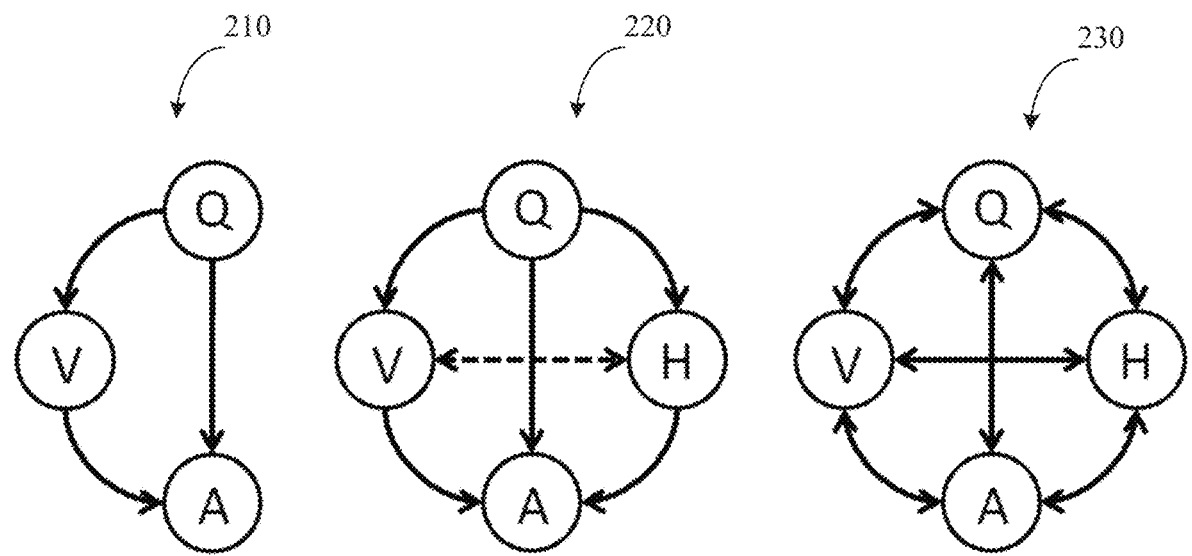
FIG. 2 is a simplified diagram of different attention mechanisms in visual dialogue, according to some embodiments.

FIG. 2 is a simplified diagram of different attention mechanisms in visual dialogue, according to some embodiments. FIG. 2 illustrates a first attention mechanism diagram 210, a second attention mechanism diagram 220 and a third attention mechanism diagram 230, where the label "V" refers to vision, the label "H" refers to dialogue history, the label "Q" refers to question, and the label "A" refers to answer. Each of the arrows denotes the attention flow direction, the solid line represents a required connection, and the dashed line represents an optional connection.

The first attention mechanism diagram 210 depicts a visual dialogue operation that predicts the answer only based on the question and an image, which excludes any consideration of the dialogue history. In the second attention mechanism diagram 220, the visual dialogue task uses the question as a query to attend relevant image regions and dialogue history, and then fuses the attended contexts for predicting the answer. In contrast, the third attention mechanism diagram 230 represents aspects of the subject technology, where a unified transformer encoder is employed to allow for full attention among all the utilities (depicted by the bidirectional considerations of each of the image, question and dialog history for producing the answer). By adapting a pre-trained language model into the vision-language domain, the subject technology can extend BERT to achieve simple yet effective fusion of vision and dialogue contents in visual dialogue tasks.

Pretraining in Vision and Language

Pre-trained language models, such as BERT, typically employ a transformer encoder as the backbone with either a two-stream architecture that uses two transformers to encode text and image independently, or a single-stream architecture, where a single transformer is applied to both text and image. In some embodiments, the transformer encoder of the subject technology is implemented with a single-stream architecture. These models may focus on the understanding task-like visual question answering, image retrieval, and visual reasoning.

In a prior approach that employs a single-stream architecture, the prior-approach model employs generation capability using a unified transformer with various self-attention masks. In some embodiments, the subject technology employs a plurality of self-attention masks that is specifically tailored for visual dialogue. Another prior approach that employs a single-stream architecture employs vision-language pretraining models for visual dialogue. The subject technology provides several advantageous benefits over the prior approaches in visual dialogue by: 1) supporting both discriminative and generative settings whereas the prior approaches in visual dialogue are restricted to only pretraining with discriminative settings, and 2) not requiring to pretrain on large-scale external vision-language datasets as opposed to the prior approaches with inferior performance metrics.

Unlike prior approaches focusing on various attention mechanisms to model such complex interaction, the subject technology provides for a pre-trained language model, such as BERT, that is enhanced to facilitate a visual dialogue task (or referred to as "VD-BERT). In this respect, the subject technology relates to a unified visual-dialogue transformer-based approach, which leverages the BERT pre-trained language models for visual dialogue tasks. Specifically, the subject technology encodes an image input and a multi-turn dialogue history input concurrently using a unified transformer and directly fine tune the pre-trained BERT on visual dialogue data for effective fusion of vision and dialogue contents. The trained model of the subject technology can either rank answer candidates or generate answers directly.

Figure 3:
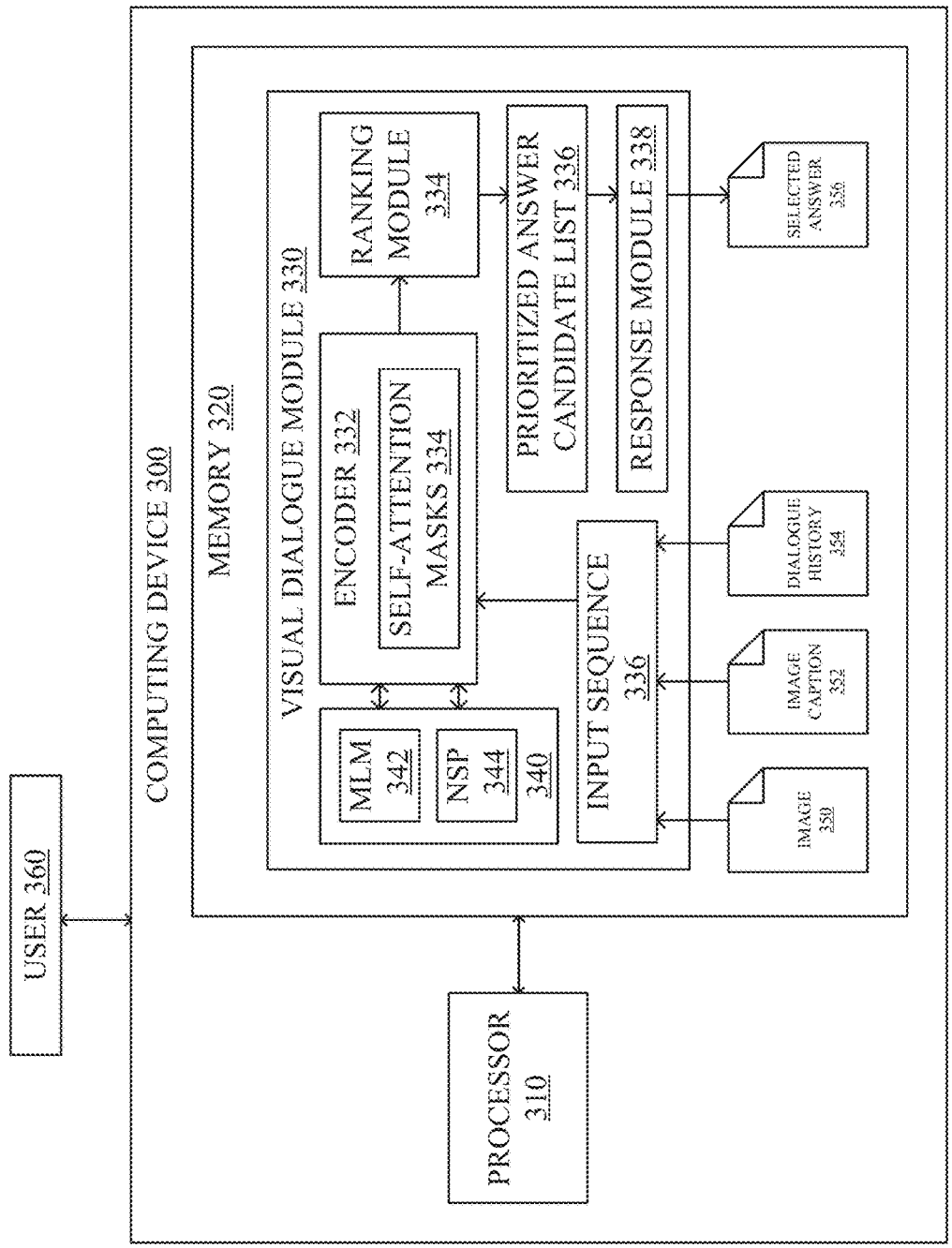
FIG. 3 is a simplified diagram of a computing device with visual dialogue, according to some embodiments.

FIG. 3 is a simplified diagram of a computing device 300 with visual dialogue, according to some embodiments. Computing device 300 includes processor 310 and memory 320. Memory 320 includes a visual dialogue module 330. The visual dialogue module 330 includes an input sequence module 331, an encoder module 332, a ranking module 334, a prioritized answer candidate list module 338, and a response module 339. In some examples, visual dialogue module 330 may be used to receive and handle the input of an image 350, an image caption 352, a dialogue history 354 via the input sequence module 336. In some examples, the visual dialogue module 330 may also handle the iterative training and/or evaluation of a system or model used for question answering tasks. The modules and/or submodules 331-338 may be serially connected or connected in other manners. For example, the encoder 332 may receive from the input sequence module 336 an output, e.g., an encoded vector representation of a concatenation of the image 350, the image caption 352 and the dialogue history 354. In some examples, visual dialogue module 330 and the sub-modules 331-338 may be implemented using hardware, software, and/or a combination of hardware and software.

As shown in FIG. 3, processor 310 is coupled to memory 320. Operation of computing device 300 is controlled by processor 310. And although computing device 300 is shown with only one processor 310, it is understood that processor 310 may be representative of one or more central processing units (CPUs), multi-core processors, microprocessors, microcontrollers, and/or the like in computing device 300. Although processor 310 may include one or more general purpose central processing units (CPUs), processor 310 may additionally or alternately include at least one processor that provides accelerated performance when evaluating neural network models. For example, processor 310 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general-purpose CPU. Computing device 300 may be implemented as a stand-alone subsystem, as a board added to a computing device, and/or as a virtual machine.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

Memory 320 may be used to store instructions executable by computing device 300 and/or one or more data structures used during operation of computing device 300. Memory 320 may include one or more types of machine-readable media. In some examples, memory 320 may include non-transitory, tangible, machine-readable media that includes executable code that when run by one or more processors (e.g., processor 310) may cause the one or more processors to perform the methods described in further detail herein. Memory 320 may include various types of short-term and/or long-term storage modules including cache memory, random access memory (RAM), static random access memory (SRAM), dynamic random access memory (DRAM), non-volatile memory (NVM), flash memory, solid state drives (SSD), hard disk drive (HDD), optical storage media, magnetic tape, any other memory chip or cartridge, and/or any other medium from which a processor or computer is adapted to read. Some common forms of machine-readable media may include flexible disk, hard disk, magnetic tape, any other magnetic medium, compact disk read-only memory (CD-ROM), any other optical medium, punch cards, paper tape, any other physical medium with patterns of holes, programmable read-only memory (PROM), erasable programmable read-only memory (EPROM), electrically erasable programmable read-only memory (EEPROM), any other memory chip or cartridge, and/or any other medium from which a processor or computer is adapted to read.

As shown, memory 320 includes a visual dialogue module 330 that may be used to implement and/or emulate the neural network systems and models described further herein and/or to implement any of the methods described further herein. Visual dialogue module 330 may be used, in some examples, for engaging in a natural language dialogue or "conversation" with a human user regarding one or more images.

The encoder 332 includes self-attention masks 333. In some embodiments, the encoder 332 is trained using visually-grounded learning objectives accessible through learning objective module 340. The learning objective module 340 may include a first learning objective 342 that represents MLM and a second learning objective 344 that represents NSP. With the second learning objective 344, the encoder 332 may provide one or more answer candidates based on a discriminative setting in the self-attention masks 333 for ranking with the ranking module 334. With the first learning objective 342, the encoder 332 may generate an answer directly based on a generative setting in the self-attention masks 333.

The ranking module 334 may rank multiple answer candidates produced by the encoder 332 and provide the ranked answer candidates to the prioritized answer candidate list module 338. The prioritized answer candidate list module 338 may include dense annotations for images that accompany the answer candidates for fine-tuning the ranked answer candidates. After fine tuning, the answer candidate can be selected and provided as a selected answer 356 via the response module 339.

According to some embodiments, a user 360 may engage in a dialogue with computing device 300. For example, user 360 may communicate with computing device 300 using any suitable form of communication, including verbal communication (e.g., spoken utterances), written communication (e.g., alphanumeric text and/or symbols), visual communication (e.g., gestures), and/or the like. In response, computing device 300 may provide one or more system responses (e.g., providing a response dialogue to user 360, performing a task on behalf of user 360, requesting additional information, and/or the like).

In some embodiments, the computing device 300 may receive input that may include image (e.g., the image 350) and text data (e.g., the image caption 352 and dialogue history 354). The dialogue history 354 can include dialogue history of turns and a current human utterance. Each turn in a dialogue may include a pair of human utterance and dialogue machine agent response to the human utterance. For example, the text can include a dialogue history H of turns t, each including a pair of (human question Q, dialogue machine agent response or answer A), formulated as $H_t = \{C, (Q_1, A_1), \ldots, (Q_{t-1}, A_{t-1})\}$, where C denotes the image caption 352. The current human utterance is a question posed to the dialogue machine agent that has not yet received a response. The output to the user 360 can include a response in natural language that can address current human utterance and create a coherent dialogue (e.g., the selected answer 356). For example, given a question $Q_t$ grounded on an image I at t-th turn, visual dialogue module 330 attempts to predict its answer $A_t$, in some examples, by ranking, using the ranking module 334, a list of multiple (e.g., 300) answer candidates $\{\hat{A}_t\}_{i=1}^{100}$. In some embodiments, the visual dialogue module 330 includes a decoder to predict the answer. The functionalities, structures and/or operations of the submodules 331-338 are further described in relation to FIG. 4.

Additionally or alternately, the visual dialogue module 330 may maintain a user scenario of a current dialogue with user 360 using the dialogue history 354. For example, dialogue history 354 may include a history of one or more previous system responses by computing device 300 (e.g., previous actions taken), which provide context for a current communication received from user 360. In other examples, dialogue history 354 may include a history of one or more conversation exchanges between a user (e.g., user 360) and computing device 300.

In some embodiments, memory 320 may store the selected answer 356 that is utilized to generate one or more system responses to provide or perform in response to a given user communication based, at least in part, on an initial user question in the human utterance. Examples of system responses include generating and sending a response dialogue to user 360, performing a task on behalf of user 360, requesting additional information from user 360, and/or the like. In some embodiments, visual dialogue module 330 may record the system response at a given exchange.

Figure 4:
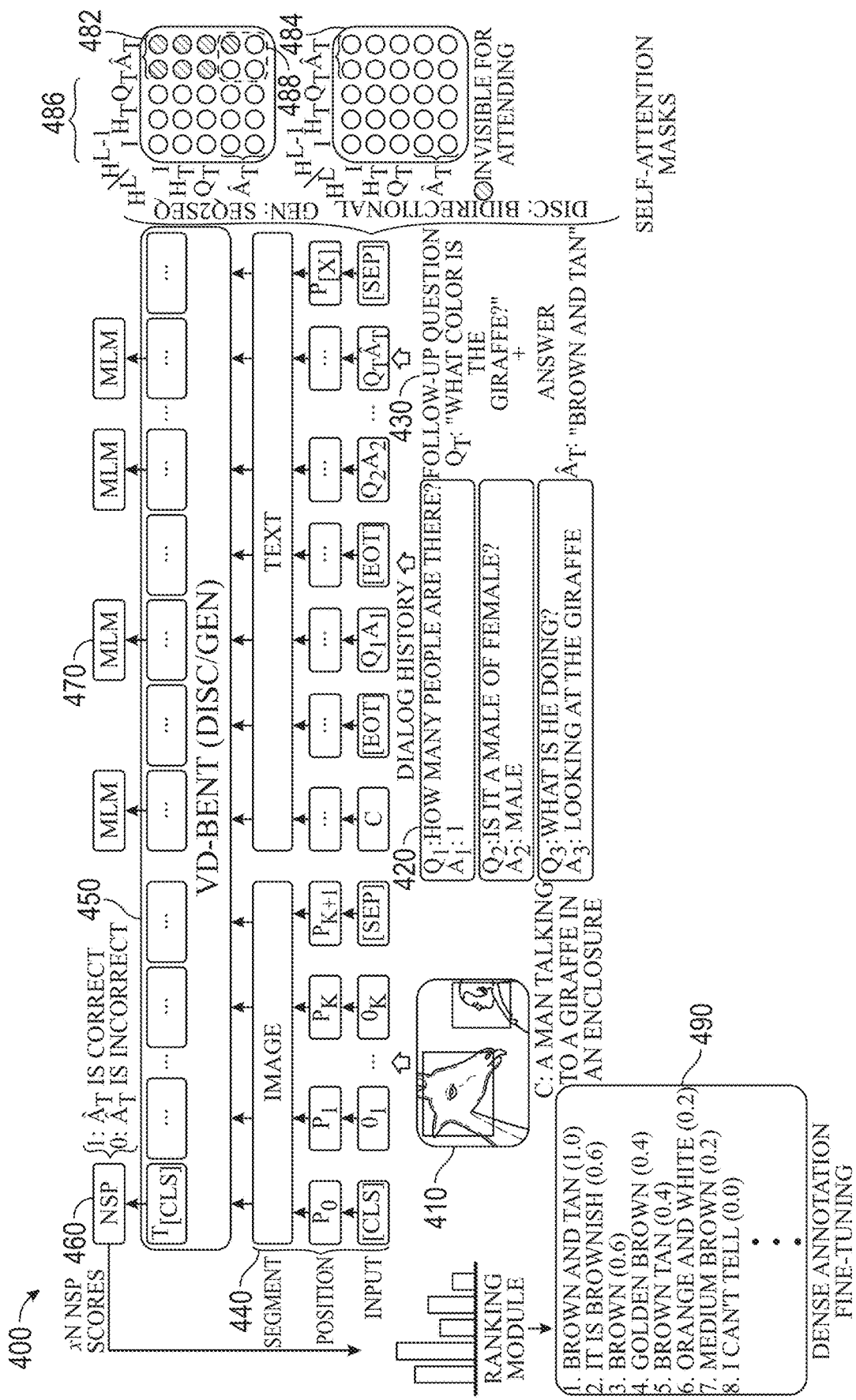
FIG. 4 is a simplified diagram illustrating an example structure of the visual dialogue module described in FIG. 3, according to some embodiments.

FIG. 4 is a simplified diagram illustrating an example structure 400 of the visual dialogue module 330 described in FIG. 3, according to some embodiments. The structure 400 includes an input sequence module 440 that is similar to the input sequence module 336 of FIG. 3. The input sequence module 440 includes a token level encoding layer 442, a position level encoding layer 444 and a segment level encoding layer 446 for each of an image path and a text path. The image path receives an image input 410 comprised of an image and image caption. The text path receives a multi-turn dialogue history input 420 and a user question 430.

The structure 400 employs a unified transformer encoder 450 to encode both the image input 410 and the multi-turn dialogue history input 420. The structure 400 employs the input sequence module 440 to first encode the image input 410 (including caption) and the multi-turn dialogue history input 420 concurrently with the unified transformer encoder 450. In some embodiments, the structure 400 can append an answer option to the input (e.g., appended to the user question 430) and model their interaction in an early fusion manner. Next, the structure 400 can adopt visually-grounded MLM and NSP learning objectives to train the unified transformer encoder 450 for effective vision and dialogue fusion using two types of self-attention masks (e.g., 334). The unified transformer encoder 450 may employ bidirectional and sequence-to-sequence (or referred to as "seq2seq") self-attention masks for the discriminative and generative settings, respectively. For example, in the discriminative settings, all of the utilities (e.g., image input 410 (depicted as "I"), dialog history 420 (depicted as "$H_T$"), user question 430 (depicted as "$Q_T$") and answer option (depicted as "$A_T$")) are not masked (denoted by non-patterned shape), and thus, all are available for attention processing. In the generative settings, all with the exclusion of the answer option are not masked and available for attention processing. In this regard, the answer option is masked using seq2seq self-attention masks. The outputs are further optimized with a ranking optimization module to further fine-tune on the dense annotations.

Given a question $Q_t$ grounded on an image I at t-th turn, as well as its dialogue history formulated as $H_t = \{C, (Q_1, A_1), \ldots, (Q_{t-1}; A_{t-1})\}$ (where C denotes the image caption), the machine agent is asked to predict its answer $A_t$ by ranking a list of 100 answer candidates $\{\hat{A}_t^1, \hat{A}_t^2, \ldots, \hat{A}_t^{100}\}$. In general, there are two types of decoders to predict the answer: either a discriminative decoder that ranks answer candidates using cross-entropy loss or a generative decoder that synthesizes an answer using a Maximum Likelihood Estimation (MLE) loss. In lieu of the decoders, the subject technology employs two different self-attention masks (i.e., bidirectional and seq2seq) for these two settings respectively.

Unlike the model architectures in prior approaches that only consider answer options at the final similarity measuring layer, the structure 400 incorporates each answer option at the input layer (e.g., 442) to facilitate its deep fusion with other utilities. Secondly, the model architectures in prior approaches typically adopt an encoder-decoder architecture with two types of decoders for the discriminative and generative settings respectively. There are typically two types of decoders: 1) discriminative decoders that can rank the answer candidates using cross entropy loss, or 2) generative decoders that synthesize an answer using MLE loss. Instead, the structure 400 adopts a unified transformer encoder and employs two different self-attention masks to support both generative and discriminative settings. Differently, the structure 400 adopts a single encoder framework based on the unified transformer encoder 450.

Vision Features

The token level encoding layer 442 (depicted as "Input") employs a Faster R-CNN model that is pretrained with visual genome to extract object-level image features denoted as $\{o_1, \ldots, o_k\}$ for image I. Each object feature of may be a 2048-dimensional Region-of-Interest (RoI) feature and k represents the number of the detected objects. In some aspects, the parameter k may be fixed to 36. As there may be no natural orders among these objects, the subject technology can adopt normalized bounding box coordinates as the spatial location. Specifically, let $(x_1; y_1)$ and $(x_2; y_2)$ be the coordinates of the bottom-left and top-right corner of the object $o_i$, its location is encoded into a fifth-dimensional (5D) vector:

$$p_i = \left(\frac{x_1}{W}, \frac{y_1}{H}, \frac{x_2}{W}, \frac{y_2}{H}, \frac{(x_2-x_1)(y_2-y_1)}{WH}\right),\quad \text{Eq. (1),}$$

where W and H denote the width and height of the image input 410, and the last element is the relative area of the object. The subject technology can further extend $p_i$ with its class identifier and confidence score for a richer representation.

Lastly, visual features with its position features and segment identifier are mapped to an embedding with the same dimension separately via a two-layer liner layer with ReLU activation and further combined with layer normalization. In some aspects, the position features may be determined with the position level encoding layer 444 and the segment identifier may be determined with the segment level encoding layer 446. In some aspects, the segment identifier may include segment level encoding that identifies visual information type of the image input, such as whether the input refers to an image or text. In some aspects, the position features include a position level encoding that identifies a spatial level ordering of frames in the image input and spatial ordering of spatial regions within each frame.

Language Features

In some aspects, the token level encoding layer 442 may pack all textual elements (e.g., image caption C, dialogue history $H_t$ (e.g., 420) and the follow-up question-answer pair $Q_t A_t$ (e.g., 430)). The token level encoding layer 442 may employ a tokenizer (e.g., WordPiece) to tokenize the long sequence by splitting the long sequence into a word sequence. In some aspects, each word may be embedded with an absolute positional code. The word embedding and position embedding may be defined following the common practice in BERT.

Cross-Modality Encoding

To feed both image and texts into the unified transformer encoder 450, the subject technology can pack the image objects with full multi-turn dialogue (including the image caption) into a long input sequence. Similar to BERT, the subject technology can use special tokens, such as "[CLS]," to denote the start of the sequence, and "[SEP]" to separate the two modalities (e.g., image, text). Moreover, as the text input contains the multi-turn dialogue history input 420, the subject technology can utilize a special token "[EOT]" to denote end-of-turn, which informs the model when the dialogue turn ends. Finally, the subject technology can prepare the input sequence into the format as x=([CLS], $o_1;...;o_k$, [SEP], C, [EOT], $Q_1 A_1$, . . . , [EOT], $Q_t A_t$, [SEP]). Each input token embedding can be combined with its position embedding and segment embedding (0 or 1, indicating whether it is image or text) before feeding to multiple transformer blocks in the unified transformer encoder 450.

Transformer Block

The unified transformer encoder 450 can denote the embedded vision-language inputs as $H^0 = [e_1, \ldots, e_{|x|}]$ and then encode them into multiple levels of contextual representations $H^l = [h_1^l, \ldots, h_{|x|}^l]$ using stacked L-stacked transformer blocks, where the l-th transformer block is denoted as $H^l = \text{Transformer}(H^{l-1})$, $l \in [1, L]$. Inside each transformer block, the previous layer's output $H^{l-1} \in \mathbb{R}^{|x| \times d_h}$ is aggregated using the multi-head self-attention:

$$Q = H^{l-1} W_l^Q,\ K = H^{l-1} W_l^K,\ V = H^{l-1} W_l^V,\quad \text{Eq. (2),}$$

$$M_{ij} = \begin{cases} 0, & \text{allow to attend} \\ -\infty, & \text{prevent from attending} \end{cases},\quad \text{Eq. (3),}$$

$$A_l = \text{softmax}\left(\frac{QK^T}{\sqrt{d_k}} + M\right) V,\quad \text{Eq. (4),}$$

where $W_l^Q$, $W_l^K$, $W_l^V \in \mathbb{R}^{d_h \times d_k}$ are learnable weights for computing the queries, keys, and values respectively, and $M \in \mathbb{R}^{|x| \times |x|}$ is a self-attention mask that determines whether tokens from two layers can attend each other. Then $H^l$ is computed by passing $A^l$ into a feedforward layer. In the following, the self-attention mask M can be adjusted accordingly to support different training settings. In some embodiments, the unified transformer encoder 450 includes about 12 transformer blocks, each with about 12 attention heads and a hidden state size of about 768.

Visually Grounded Learning Objectives

The unified transformer encoder 450 can use two visually-grounded learning objectives—masked language modeling (e.g., 470) and next-sentence prediction (e.g., 460) to train the unified transformer encoder 450 conditioned on the image input 410. Particularly, the subject technology aims to capture dense interactions among both inter-modality (e.g., image-dialogue) and intra-modality (e.g., image-image, dialogue-dialogue).

Similar to MLM in BERT, a subset of tokens in a text segment (including special tokens such as "[EOT]" and "[SEP]") can be randomly masked out and replaced with a special token "[MASK]." The model may be tasked to recover them based on not only other unmasked surrounding tokens $w_{\setminus m}$ but also the visual features on the image I:

$$\mathcal{L}_{MLM} = -E_{(I,w) \sim D} \log P(w_m | w_{\setminus m}, I) \quad \text{Eq (5),}$$

where $w_m$ refers to the masked token and D denotes the training set.

In some embodiments, the unified transformer encoder 450 may not conduct any masked object/region modeling in the image segment. As for NSP, instead of modeling the relationship between two sentences in BERT or the alignment of an image-text pair in other vision language extensions, the unified transformer encoder 450 aims to predict whether the appended answer candidate $\hat{A}_t$ is correct or not based on the joint understanding of vision and previous dialogue history:

$$\mathcal{L}_{NSP} = -E_{(I,w) \sim D} \log P(y | S(I,w)) \quad \text{Eq (6),}$$

where $y \in \{0,1\}$ indicates whether $\hat{A}_t$ is correct, and $S(\cdot)$ is a binary classifier to predict the probability based on the [CLS] representation $T_{[CLS]}$ at the final layer.

Generative Setting

To preserve the autoregressive property of the answer generation, the unified transformer encoder 450 can employ the sequence-to-sequence (seq2seq) self-attention mask for a generative setting 482. Namely, the unified transformer encoder 450 may prevent attending future tokens when predicting each token of the answer sequence. Specifically, the structure 400 can divide the input sequence for each transformer block into two subsequences: a previous context sequence (including image input 410 and caption (depicted as I), dialogue history 420 (depicted as $H_e$), and question 430 (depicted as $Q_t$)) and the answer sequence:

$$x \triangleq (I,w) = (I, H_t, Q_t, \hat{A}_t) \quad \text{Eq. (7).}$$

The subject technology may allow tokens in the context sequence to be fully visible for attending by setting the left part of M to all 0s (e.g., 486). As for the answer sequence, the subject technology may set the lower right part of M to an upper triangular submatrix of ∞ to ensure that each token can only attend those ahead of it (e.g., 488). For example, the subject technology can mask out (by setting −∞ in M) the "future" tokens to obtain autoregressive attentions.

In inference, the subject technology may rely on the unified transformer encoder 450 by recursively applying MLM operations without an explicit decoder. Specifically, the subject technology can append a "[MASK]" to the end of the sequence to trigger a one-step prediction and then replace it with the predicted token before the next prediction. The subject technology can adopt greedy sampling for each prediction step and terminate the decoding process when a "[SEP]" is emitted. Lastly, the answer candidates are ranked based on their log-likelihood scores (e.g., 490).

Discriminative Setting

The subject technology can transform the task of selecting an answer from a candidate pool into a pointwise binary classification operation. Concretely, the subject technology can sample an answer $\hat{A}_t$ from the candidate pool and append it to the input sequence, and cause the NSP head to utilize the final hidden vector $T_{[CLS]}$ of the "[CLS]" as the NSP 460 head for binary classification to distinguish whether the appended answer is correct or not. The structure 400 can employ the bidirectional self-attention mask to allow all the tokens to attend each other by setting M to all 0s (e.g., 484). During training, the subject technology can keep the ratio of positive and negative instances as 1:1 at each epoch to avoid imbalanced class distribution. To encourage the model to penalize more on negative examples, the subject technology can randomly resample a negative example from a pool of about 99 negatives with respect to every positive in every epoch. During inference, the subject technology can rank the answer candidates according to the positive class scores of their NSP head (e.g., 490).

Fine-Tuning with Ranking Optimization

As some answer candidates may be semantically identical (e.g. 'yeah' and 'yes'), the subject technology may additionally provide dense annotations that specify the relevance scores $[s_1, \ldots, s_{100}]$ of the 100 answer candidates. Concretely, the dense annotation specifies a relevance score for each answer candidate based on the hypothesis that some candidates with similar semantics to the ground truth answer can also be considered as correct or partially correct, e.g., "brown and tan" and "brown" in FIG. 5. To fine-tune on these dense annotations, the subject technology combine the NSP scores for all answer candidates together and normalize them into a probability distribution $[p_1, \ldots, p_{100}]$. In other aspects, a cross entropy (CE) loss L can be employed to optimize the model:

$$\mathcal{L}_{ListNet} = -\sum_{i=1}^{N} f(s_i)\log(f(p_i)),$$ Eq. (8), $$f(x) = \frac{\exp(x_i)}{\sum_{j=1}^{N}\exp(x_j)}, \quad i = 1, \ldots, N.$$ Eq. (9).

For training efficiency, the subject technology can subsample and use N=30 answer candidates for each instance in practice. To make better use of dense annotations, the subject technology can construct the sampled answer candidate list by firstly considering non-zero relevance score candidates and then the zero ones. In some aspects, there may be on average about 12 out of 100 (or about 12%) answer candidates containing non-zero relevance scores.

Figure 5A:
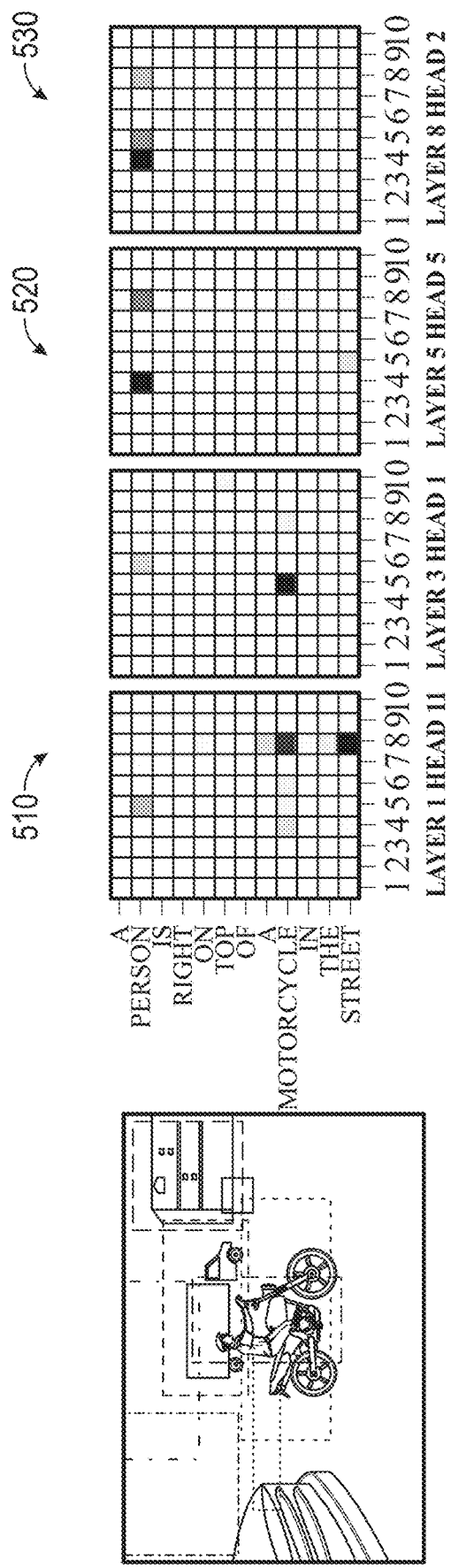
FIGS. 5A-5C are diagrams conceptually illustrating attention weight visualization with a trained neural network model in visual dialogue, according to some embodiments.
Figure 5B:
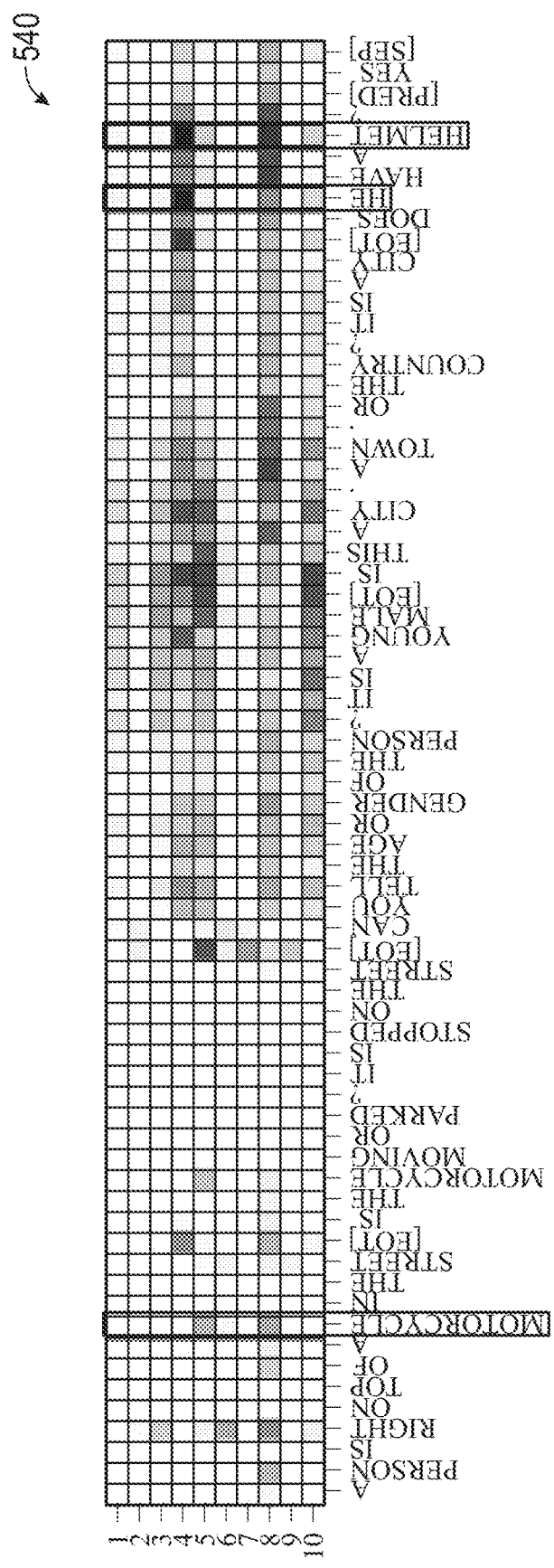
Figure 5C:
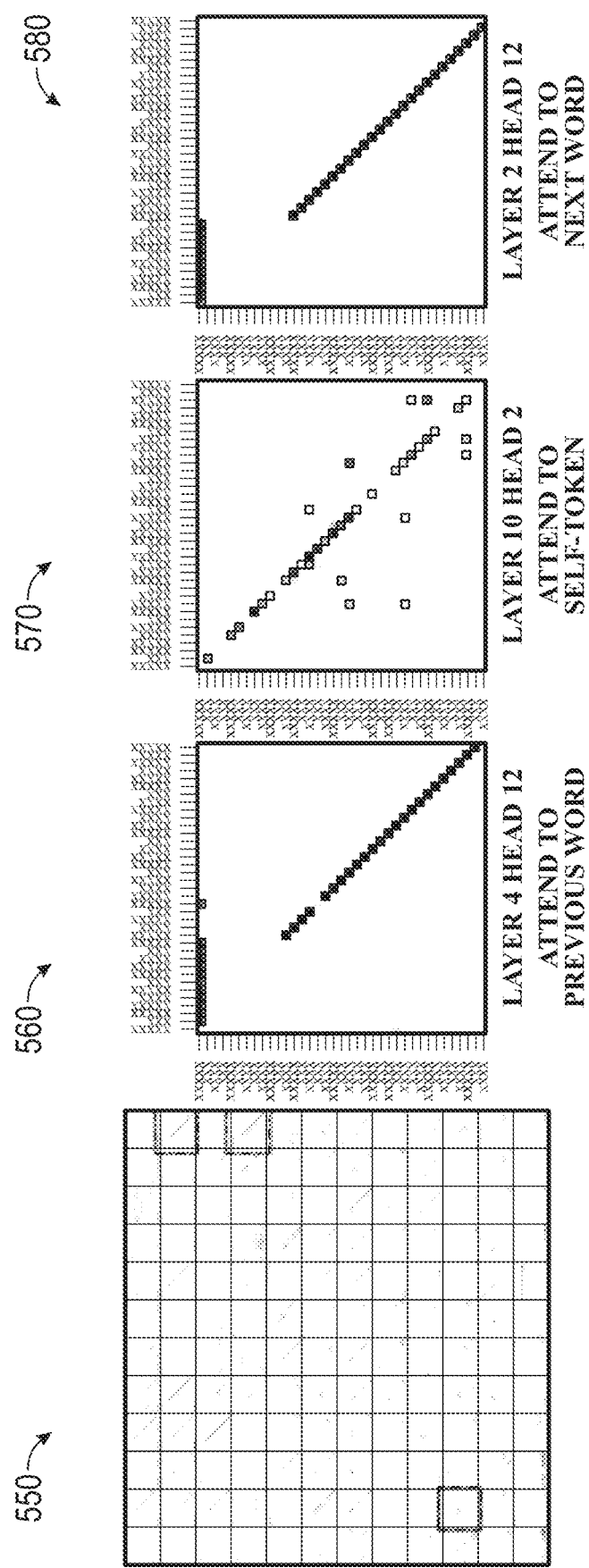

FIGS. 5A-5C are diagrams conceptually illustrating attention weight visualization with a trained neural network model in visual dialogue, according to some embodiments. FIG. 5A illustrates a subset of selected heads at various layers capturing the image-caption alignment via grounding entities. FIG. 5B illustrates an attention heatmap showing the fusion of image and multiturn dialogue. FIG. 5C illustrates heatmaps of all 144 heads for both image and a single-turn dialog with some attention patterns.

The individual heatmap plots in FIG. 5A can indicate whether the attention heads in the subject visual dialogue neural network model can be used for entity grounding. The subject technology can visualize the attention weights on the top 10 detected objects in the image from its caption. The subject visual dialogue neural network model can observe that many heads at different layers can correctly ground some entities, such as person and motorcycle in the image, and reveal high-level semantic correlations such as person↔motorcycle (at Layer 5 Head 5 and Layer 8 Head 2) and motorcycle↔street (at Layer 1 Head 11). On the other hand, heads at higher layers may have a sharper focus on specific visual objects such as the person and the motorcycles.

In FIG. 5B, the subject technology can capture the interactions between image and dialog history. The subject visual dialogue neural network model can ground entities and detect object relations (e.g., a helmet that is precisely related to the person and the motorcycle in the image). More interestingly, it can even resolve visual pronoun coreference of he in the question to the man in the image (e.g., 540).

In FIG. 5C, the subject technology can analyze the self-attention weights for all layers and all heads for both image and dialogue segments. Instead of attempting to interpret all 144 heads (where there are 12 layers and each layer has 12 heads), the subject technology can analyze them in a holistic way (e.g., 550). Compared to the words in the dialogue, visual objects can receive lesser attention in most cases. FIG. 5C also illustrates three other apparent attention patterns: attentions that a token applies to its previous token (e.g., 560), to itself (e.g., 570), and to the next token (e.g., 580). In some aspects, the patterns for image and text as observed in FIG. 5C can be disparate (where the image objects can hardly learn to attend previous/next tokens) as objects in the image may lack explicit orders such as tokens in a text.

Figure 6:
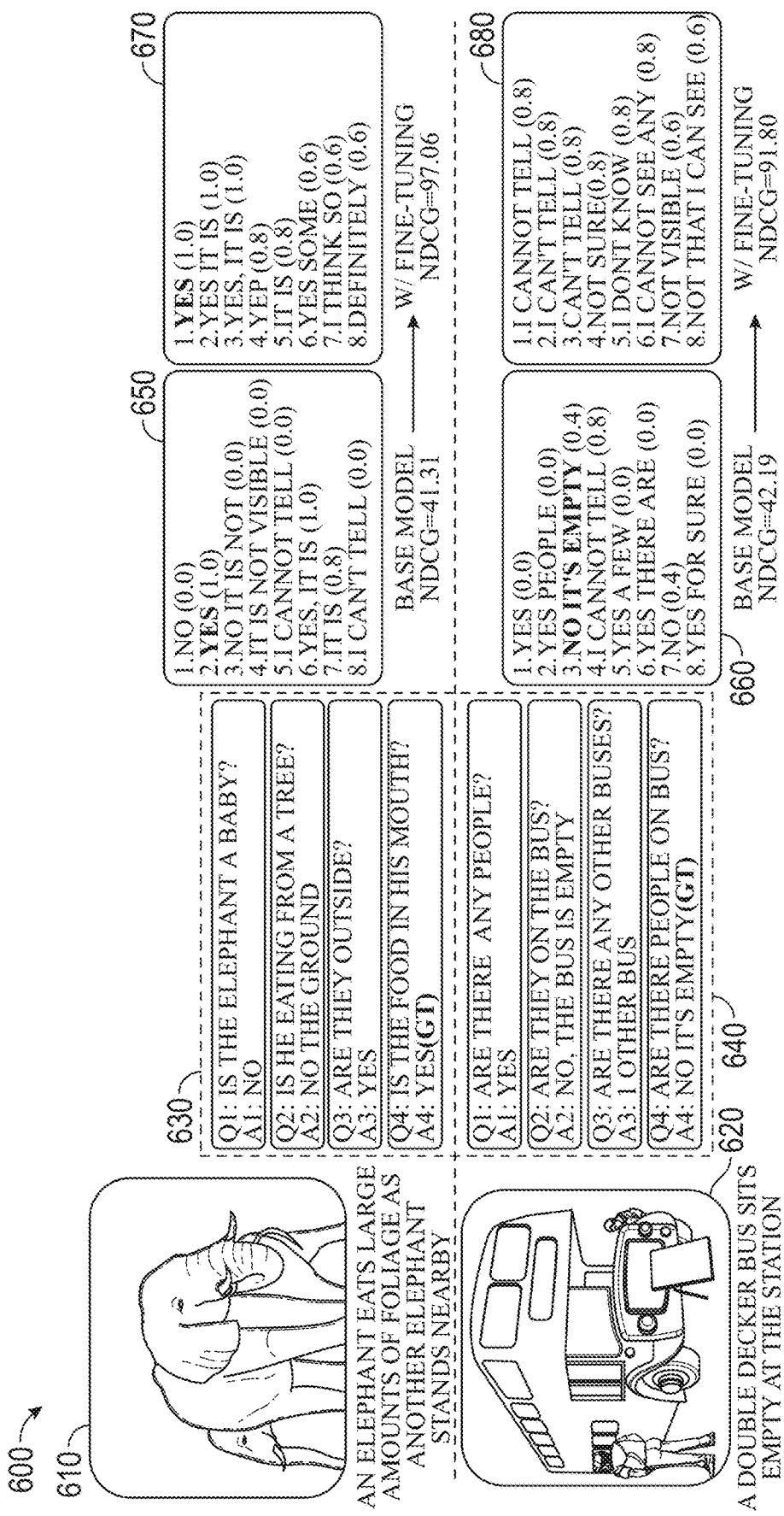
FIG. 6 is a simplified diagram illustrating an example of fine-tune ranking optimization in visual dialogue, according to some embodiments.

FIG. 6 is a simplified diagram illustrating an example of fine-tune ranking optimization 600 in visual dialogue, according to some embodiments. In FIG. 6, a first image example 610 depicts an elephant with an image caption that reads "An elephant eats large amounts of foliage as another elephant stands nearby." The first image example 610 is associated with a dialogue history 630. A second image example 620 depicts a double-decker bus with an image caption that reads "A double decker bus sits empty at the station." The second image example 620 is associated with a dialogue history 640. After fine-tuning on the dense annotations, the visual dialogue model of the subject technology can increase the relevancy scores for both examples (e.g., 610, 620). For the first image example 610, the visual dialogue model of the subject technology can predict relevant answer options with higher ranks, e.g., "yes, it is" and "yep", which share the similar semantics with the ground truth answer "yes" and can be regarded as the correct answers. For example, the relevant answer options 650 are listed based on a base model and the relevant answer options 670 are listed based on fine tuning, each relevant answer option based on fine tuning has a non-zero relevancy score. In the second image example 620, the visual dialogue model of the subject technology can detect a mismatch between the sparse annotation and dense annotation, i.e., the ground truth answer "no, it's empty" is labeled with a relevance score of 0.4. Instead, a set of answer options about "I don't know" are considered to be more relevant with a relevance score of 0.8. In some examples, the relevant answer options 660 are listed based on a base model and the relevant answer options 680 are listed based on fine tuning, each relevant answer option based on fine tuning has a non-zero relevancy score. In some aspects, a large subset of ground-truth answers based on fine tuning have a relevance score 0.8, and a smaller subset of ground-truth answers have a relevance score 0.6. Such data annotation bias can adversely impact the performance inconsistency issue among various metrics.

Figure 7:
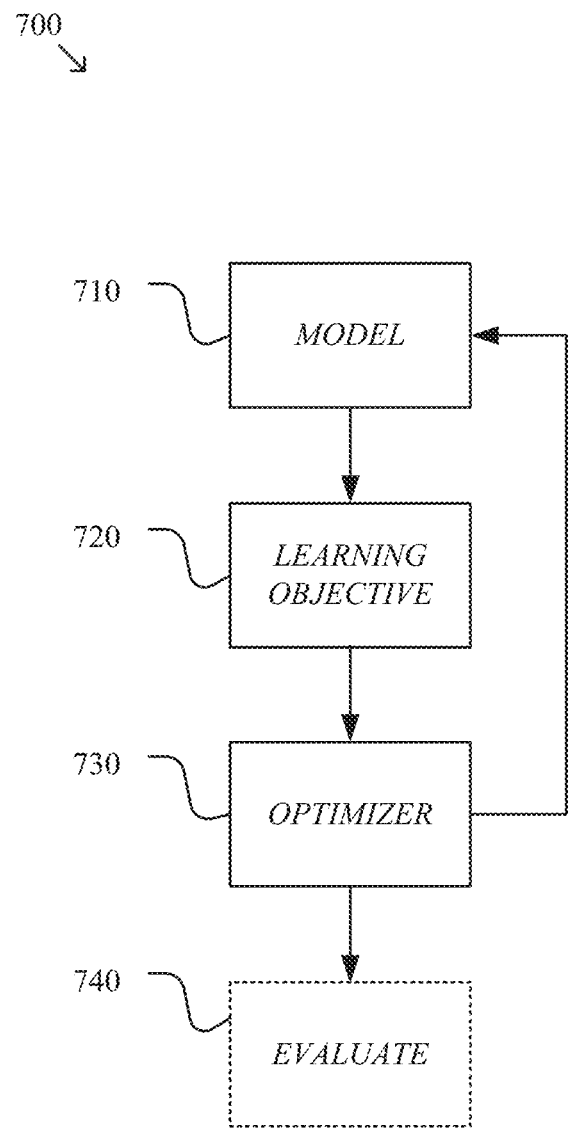
FIG. 7 is a simplified diagram of an example process for training a neural network model, according to some embodiments.

FIG. 7 is a simplified diagram of an example process 700 for training a neural network model, according to some embodiments. As depicted in FIG. 7, process 700 is used to train a model 710, such as a unified visual dialogue model. In some embodiments consistent with FIGS. 1-4, model 710 may be used to implement one or more of the visual dialogue module 330 or the unified transformer encoder 450.

In some embodiments, process 700 may be used to train a plurality of model parameters of model 710. The unified transformer encoder 450 may be trained with a bidirectional self-attention mask using MLM and NSP losses (with coefficients set to 1) for about 20 epochs. For negative samples, MLM is not conducted on the answer sequence. For generative setting, the subject technology employs seq2seq self-attention mask and further optimizes the model using only MLM loss for another 10 epochs.

During training, a large number of training examples (e.g., image/caption sequences, visually-grounded pretraining objectives, dense annotations, and/or self-attention mask settings) are provided to model 710. The predicted answer scores (e.g., answer candidates) generated by model 710 are compared to a ground truth value for each of the examples using a learning objective 720, which may determine a cross entropy loss associated with a given predicted answer score based on the ground truth value. In various embodiments, the learning objective 720 corresponds to a training target for the model 710, in which the learning objective 720 may target the model 710 to learn how to generate an answer that is expected to be generated.

The output of the learning objective 720 (e.g., cross-entropy loss) is provided to an optimizer 630 to update the model parameters of model 710. For example, optimizer 630 may determine the gradient of the objective with respect to the model parameters and adjust the model parameters using back propagation. In some embodiments, optimizer 630 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 630 (e.g., a learning rate, a decay parameter, and/or the like) depending on the type of optimizer used. For example, the visual dialogue module 330 is trained by providing the learning objective 720 to the ADAM optimizer with a learning rate of about $3e^{-5}$, a batch size of about 32, a linear learning rate decay schedule with a warm-up rate of about 0.1 and a dropout rate of about 0.35.

At a process 640, the optimized model can be evaluated for testing based on ranking metrics of the answer candidates. In some aspects, the visual dialogue model of the subject technology can be evaluated using ranking metrics, such as Recall@K (K in {1, 5, 10}), Mean Reciprocal Rank (MRR), and Mean Rank, where only one correct answer is included in the prioritized answer candidate list 338. In some embodiments, the learning objective may correspond to learning objective 720. In some embodiments, the learning objective may be evaluated by comparing the answer candidates predicted at model 610 to a ground truth answer corresponding to the training communication.

The visual dialogue model of the subject technology can be evaluated with a first dataset that may consist of a train split (e.g., 82,783 images) and val split (e.g., 40,504 images), which are combined as the train split in a second dataset. The first dataset may additionally contain about 2,064 images for validation and about 8,000 images for test (hosted blindly in a test server). Each image in the dataset may be associated with one caption and 10 question-answer pairs. For each question, the image is paired with a list of 100 answer candidates, where there is only one regarded as correct. In the first dataset val split and part of first dataset train split (e.g., about 2,000 images), additional dense annotations for all answer candidates are provided for a more reasonable evaluation. Concretely, the dense annotation specifies a relevance score for each answer candidate based on a hypothesis that some candidates with similar semantics to the ground truth answer can also be considered as correct or partially correct, e.g., "brown and tan" and "brown" in FIG. 5.

Figure 8:
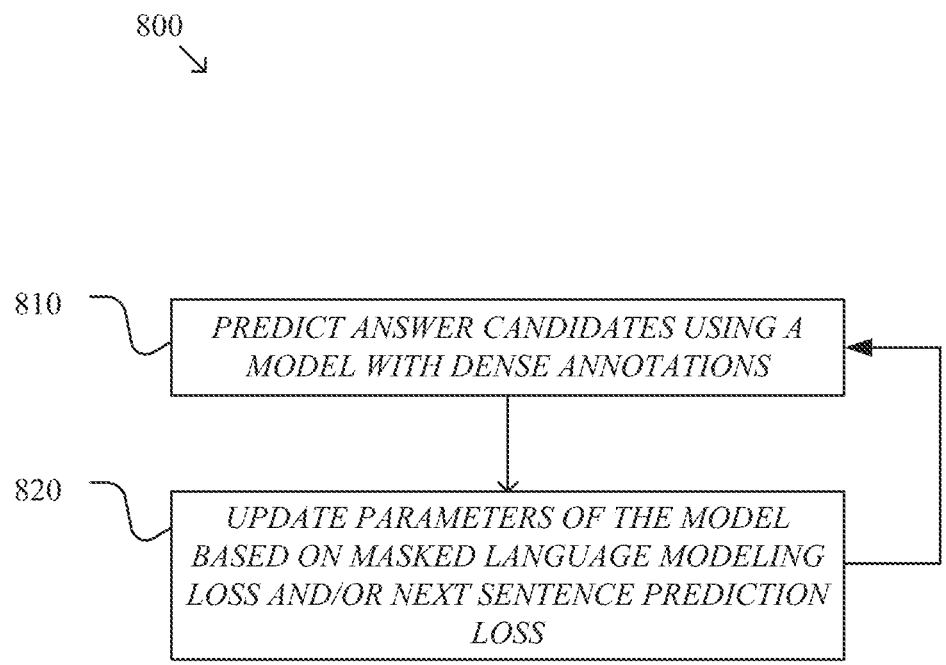
FIG. 8 is a simplified diagram of a process for evaluating a trained neural network model in visual dialogue, according to some embodiments.

FIG. 8 is a simplified diagram of a process 800 for evaluating a trained neural network model in visual dialogue, according to some embodiments. In various embodiments consistent with FIGS. 3-4, process 800 may be used to train a neural network model, such as visual dialogue module 330 and/or unified transformer encoder 450. During training, the neural network model may be configured in a training configuration, such as process 700. In some examples, process 800 may be performed iteratively over a large number of training examples to gradually train the neural network model.

At a process 810, answer candidates are predicted using dense annotations with the neural network model. In some embodiments, the answer candidates may be generated based on a training example that includes a training communication. In some embodiments, the answer candidates may be generated according to process 800.

At a process 820, the parameters of the neural network model are updated based on the learning objective. In some embodiments, the model parameters may be updated using an optimizer, such as optimizer 630. In some embodiments, the parameters may be updated by determining a gradient of the learning objective with respect to the model parameters and updating the parameters based on the gradient. The gradient of the learning objective may be determined by back propagation.

Figure 9:
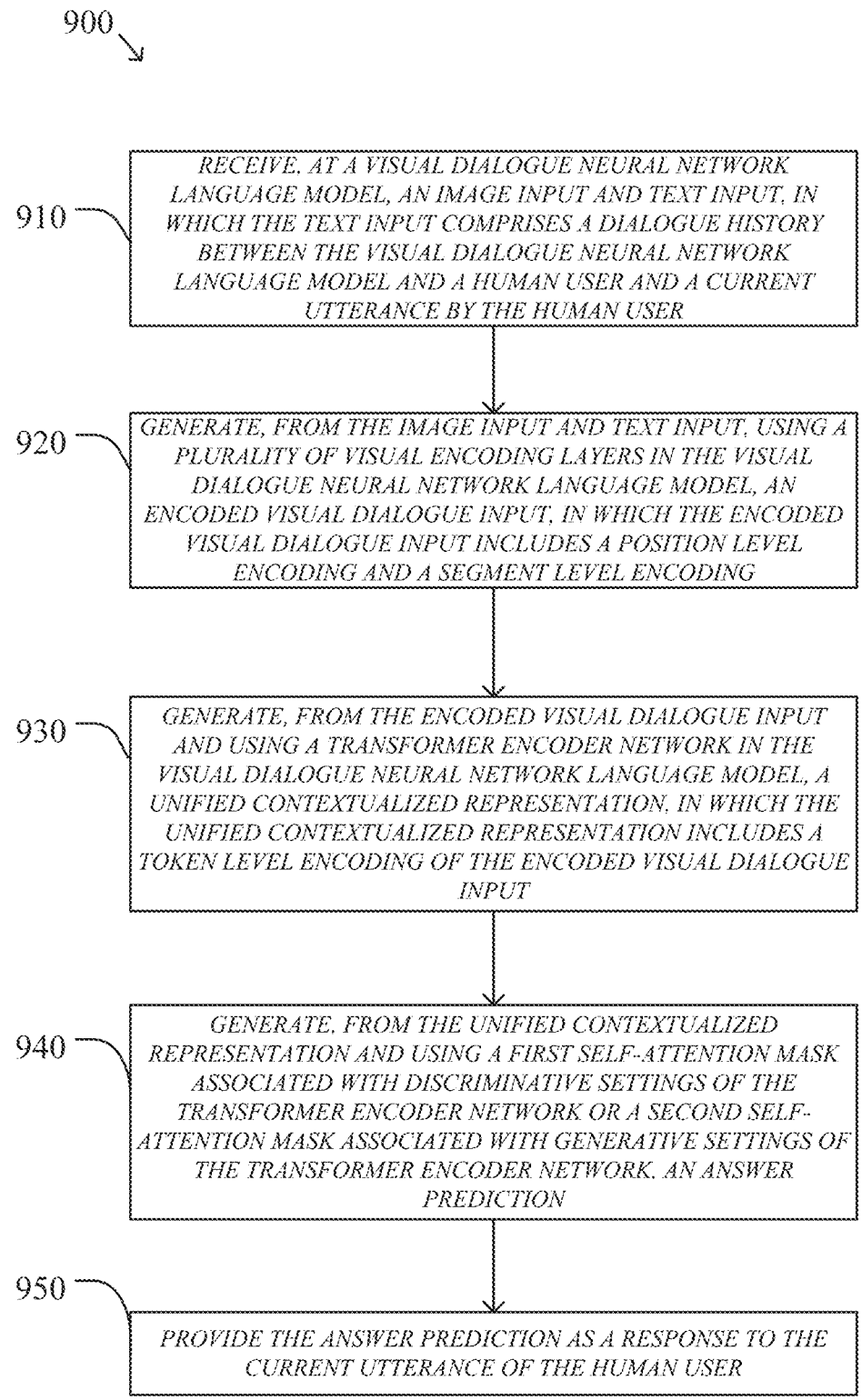
FIG. 9 is a simplified diagram of an example process for using a trained neural network model in visual dialogue, according to some embodiments.

FIG. 9 is a simplified logic flow diagram of an example process 900 of performing visual dialogue, according to some embodiments. In some embodiments, the operations of FIG. 9 may be implemented, at least in part, in the form of executable code stored on non-transitory, tangible, machine-readable media that when run by one or more processors may cause the one or more processors to perform one or more of the operations 910-970. In some embodiments, process 900 corresponds to the operation of visual dialogue module 330 (FIG. 3) or computing device 300 (FIG. 3) to perform a visual dialogue task. In various embodiments, the operations of FIG. 9 may be implemented as software instructions executed by one or more logic devices associated with corresponding electronic devices and/or structures depicted in FIGS. 3 and 4. More generally, the operations of FIG. 9 may be implemented with any combination of software instructions, neural networks, and/or electronic hardware (e.g., digital components).

It should also be appreciated that any step, sub-step, sub-process, or block of process 900 may be performed in an order or arrangement different from the embodiments illustrated by FIG. 9. For example, in other embodiments, one or more blocks may be omitted from or added to each individual process. Furthermore, block inputs, block outputs, state information, and/or other operational parameters may be stored to one or more memories prior to moving to a following portion of a corresponding process. Although process 900 is described with reference to systems described in FIGS. 3-4, process 900 may be performed by other systems different from those systems and including a different selection of electronic devices, neural networks, and/or pre-trained model parameters.

The process 900 starts at step 910, where the visual dialogue module 330 receives image input and text sequences. The image input may relate to one or more images over which the neural network model or machine agent engages in a dialogue or conversation with a human user. The text sequences can include captions for the one or more images, and a dialogue history between the visual dialogue module 330 and the user, such dialogue history including human utterance and dialogue machine agent response. The text sequences may also include a current human utterance (or question) for which the model should provide a response (or answer).

Next, at step 920, the module 330 generates, from the visual input and text input, using a plurality of visual encoding layers in the visual dialogue neural network language model, an encoded visual dialogue input. In some aspects, the encoded visual dialogue input includes a position level encoding and a segment level encoding. In some embodiments, the plurality of visual encoding layers is implemented with the encoder 332.

Subsequently, at step 930, the module 330 generates, from the encoded visual dialogue input and using a transformer encoder network in the visual dialogue neural network language model, a unified contextualized representation. In some aspects, the unified contextualized representation includes a token level encoding of the encoded visual dialogue input. In some embodiments, the transformer encoder network is implemented with a pre-trained language model, such as a visual-dialogue-BERT (or referred to as "VD-BERT").

Next, at step 940, the module 330 generates, from the unified contextualized representation and using a first self-attention mask associated with discriminative settings of the transformer encoder network or a second self-attention mask associated with generative settings of the transformer encoder network, an answer prediction. Subsequently, at step 950, the module 330 provides the answer prediction as a response to the current utterance of the human user.

One or more of the processes of process 900 may be implemented, at least in part, in the form of executable code stored on non-transitory, tangible, machine-readable media that when run by one or more processors may cause the one or more processors to perform one or more of the processes. Some examples of computing devices, such as computing device 100 may include non-transitory, tangible, machine readable media that include executable code that when run by one or more processors (e.g., processor 310) may cause the one or more processors to perform the processes of process 900. Some common forms of machine readable media that may include the processes of process 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 10:
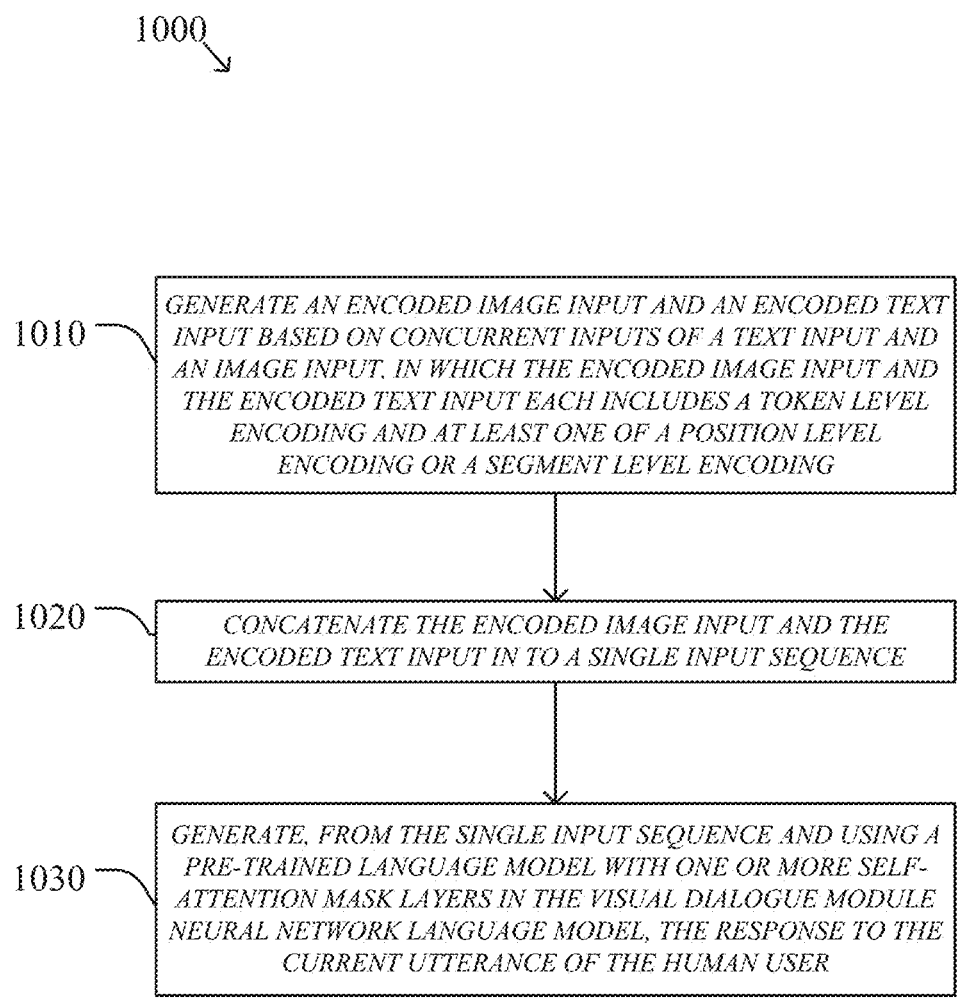
FIG. 10 is a simplified diagram of an example process for using a pre-trained language model in visual dialogue, according to some embodiments.

FIG. 10 is a simplified diagram of a process 1000 for visual dialogue, according to some embodiments. In some embodiments, one or more of the processes of process 1000 may be implemented, at least in part, in the form of executable code stored on non-transitory, tangible, machine-readable media that when run by one or more processors may cause the one or more processors to perform one or more of the processes. In some embodiments, process 1000 corresponds to the operation of visual dialogue module 330 (FIG. 3) or computing device 300 (FIG. 3) to perform a visual dialogue task. Some examples of computing devices, such as computing device 300 may include non-transitory, tangible, machine readable media that include executable code that when run by one or more processors (e.g., processor 310) may cause the one or more processors to perform the processes of process 1000. Some common forms of machine readable media that may include the processes of process 1000 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

It should also be appreciated that any step, sub-step, sub-process, or block of process 1000 may be performed in an order or arrangement different from the embodiments illustrated by FIG. 10. For example, in other embodiments, one or more blocks may be omitted from or added to each individual process. Furthermore, block inputs, block outputs, state information, and/or other operational parameters may be stored to one or more memories prior to moving to a following portion of a corresponding process. Although process 1000 is described with reference to systems described in FIGS. 3-4, process 1000 may be performed by other systems different from those systems and including a different selection of electronic devices, neural networks, and/or pre-trained model parameters.

The process 1000 starts at step 1010, where an image input and a text input are encoded. In some aspects, the visual dialogue module 330 may receive image data (e.g., image 350) and text data (e.g., image caption 352, dialogue history 354). As discussed above, the text data may include the dialogue history 354 between the model 300 and a human user, such as dialogue history that includes pairs of a human utterance and dialogue machine agent response generated by the visual dialogue module 330. The text data may also include one or more captions 352 relating or corresponding to the image data 350. The image data 350 may include image in a form of image frames that is subject to the conversation between the human user and machine agent in or coupled to visual dialogue module 330.

Regarding the image input encoding, the token level encoding layer 442 performs token-level encoding on the image data 350, which encodes image data 350 into image token encodings $z_V^{token}$. As discussed above, image token encodings $Z_V^{token}$ may be generated using a pre-trained Faster R-CNN model with an output that is passed through a linear transformation with ReLU activation. The position level encoding layer 444 encodes the spatial regions into spatial level ordering. The output of the position level encoding layer 444 are position encodings $Z_V^{pos}$. The segment-level encoding layer 446 encodes the spatial regions into the frame-level (or segment-level) positions of input features of the frame or segment level. The output of the segment level encoding layer 446 are segment encodings $Z_V^{segment}$. The combined encodings from the token level encoding layer 442, position level encoding layer 444, and segment level encoding layer 446 may be referred to as encoding representation $Z_V$. In some embodiments, the encoding representation $Z_V$ may include spatial encodings and at least one of modality encodings, temporal encodings, or position encodings.

Regarding the text input encoding, the token level encoding layer 442 breaks down dialogue history 354 in to a sequence of dialogue turns where each dialogue turn is represented as a pair of user utterance and response (e.g., selected answer 356) and where each utterance and response are represented as a sequence of tokens. The token level encoding layer 442 also breaks down image caption 352 into tokens. Further, the tokens from the image captions 352, user utterance in dialogue history 354 and response may be combined into a single token sequence $X_T$, with the system response (e.g., selected answer 356) being shifted to a previous response. The output of the token level encoding layer 442 are the token encodings $Z_T^{token}$. The position level encoding layer 444 injects the position encoding into the token encoding. The output of the position level encoding layer 444 are position encodings $Z_T^{pos}$. The segment level encoding layer 446 encodes the tokens with segment identifiers "image," and "text" that specify whether the token in the corresponding position are part of caption 352, candidate answer, or human utterance. The combined encodings from the token level encoding layer 442, position level encoding layer 444, and segment level encoding layer 446 may be referred to as encoding representation $Z_T$. In some embodiments, the encoding representation $Z_T$ may include token encodings and at least one of position encodings, or segment encodings.

At step 1020, the encoded image input and the encoded text input are concatenated in to a single input sequence. For example, visual dialogue module 330 concatenates the encoded image data (encoding representation $Z_V$) and encoded text data (encoding representation $Z_T$) into a single input segment $Z_{VT}$.

At step 1030, a response is determined. For example, the visual dialogue model 300 receives the single input segment $Z_{VT}$ generated at step 1020 and determines a system response (e.g., selected answer 356) from the single input segment. As discussed above, the system response is a response to a current human utterance of a human user.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for performing a visual dialogue task by a neural network model, the method comprising: receiving, at a visual dialogue neural network language model, an image input and text input, wherein the text input comprises a dialogue history between the visual dialogue neural network language model and a human user and a current utterance by the human user; generating, from the image input and text input and using a transformer encoder network in the visual dialogue neural network language model, a unified contextualized representation, wherein the unified contextualized representation includes a token level encoding of the image input and text input; generating, from the unified contextualized representation, using a plurality of visual encoding layers in the visual dialogue neural network language model, an encoded visual dialogue input, wherein the encoded visual dialogue input includes a position level encoding and a segment type encoding; generating, from the encoded visual dialogue input and using a first self-attention mask associated with discriminative settings of the transformer encoder network or a second self-attention mask associated with generative settings of the transformer encoder network, an answer prediction, wherein the generating comprises setting a first subset of generative settings associated with the second self-attention mask to zero values that allows each token in a context sequence to be visible for attending to each other with one or more attention layers in the transformer encoder network; and providing the answer prediction as a response to the current.

2. The method of claim 1, wherein the unified contextualized representation comprises a concatenation of the image input and the text input that comprises a caption of the image input, a dialogue history of a user-machine interaction and a user question of the current utterance.

3. The method of claim 1, wherein generating the answer prediction comprises:
masking, at the visual dialogue neural network language model, in a random order, a subset of tokens including special tokens in a text segment of the text input; and
replacing the subset of tokens including the special tokens with a mask token using masked language modeling.

4. The method of claim 1, further comprising:
setting a second subset of generative settings associated with the second self-attention mask to non-zero values for attending one or more tokens ahead of a subject token in an answer sequence with the one or more attention layers in the transformer encoder network, wherein the second subset is different from the first subset.

5. The method of claim 1, wherein generating the answer prediction comprises:
generating, by the visual dialogue neural network language model, a prediction indicating a likelihood of whether an appended answer in the text input is correct or not based on the encoded visual dialogue input using a next-sentence prediction (NSP) operation.

6. The method of claim 5, further comprising:
setting each of a plurality of discriminative settings associated with the first self-attention mask to zero values that allows each token to be visible for attending to each other with one or more attention layers in the transformer encoder network.

7. The method of claim 5, further comprising:
utilizing a final hidden vector corresponding to a special token in the unified contextualized representation as a head token in the NSP operation for binary classification of the appended answer to distinguish whether the appended answer is correct or not.

8. The method of claim 1, wherein generating the answer prediction comprises:
generating, by the transformer encoder network, a plurality of answer candidates; and
providing, by a ranking module of the visual dialogue neural network language model, a plurality of dense annotations that specify a plurality of relevance scores for the plurality of answer candidates.

9. The method of claim 8, further comprising:
combining the plurality of relevance scores for each of the plurality of answer candidates to form a combined set of relevance scores; and
normalizing the combined set of relevance scores into a probability distribution to fine tune the plurality of dense annotations.

10. The method of claim 8, further comprising:
generating a sampled answer candidate list that comprises the plurality of relevance scores based at least in part on first relevance score candidates with non-zero values having a first priority and second relevance score candidates with zero values having a second priority, wherein the first priority is greater than the second priority.

11. A system comprising:
a non-transitory memory; and
one or more hardware processors coupled to the non-transitory memory and configured to read instructions from the non-transitory memory to cause the system to perform operations comprising:
receiving, at a visual dialogue module neural network language model, an image input and text input, wherein the text input comprises a dialogue history between the visual dialogue module neural network language model and a human user and a current utterance by the human user;
generating, using a plurality of image encoding layers in the visual dialogue module neural network language model, an encoded image input, wherein the encoded image input includes a token level encoding and at least one of a position level encoding or a segment level encoding;
generating, using a plurality of text encoding layers in the visual dialogue module neural network language model, an encoded text input, wherein the encoded text input includes a token level encoding and at least one of a position level encoding or a segment level encoding,
wherein a position level encoding layer from the plurality of image encoding layers generates the position level encoding, and wherein the position level encoding identifies a spatial level ordering of frames in the image input and spatial ordering of spatial regions within each frame;
concatenating the encoded image input and the encoded text input into a single input sequence; and
generating, from the single input sequence and using a pre-trained language model with one or more self-attention mask layers in the visual dialogue module neural network language model, a response to the current utterance of the human user.

12. The system of claim 11, wherein a segment level encoding layer from the plurality of image encoding layers generates the segment level encoding from the image input, wherein the segment level encoding identifies visual information type of the image input.

13. The system of claim 11, wherein a token level encoding layer from the plurality of text encoding layers generates the token level encoding from the text input, wherein the token level encoding identifies text information type of a token in the text input that indicates that the token is included in a caption, an utterance of the human user in the dialogue history or a language model response.

14. The system of claim 11, wherein a position level encoding layer from the plurality of text encoding layers generates the position level encoding, wherein the position level encoding identifies a token ordering in the text input.

15. A non-transitory, machine-readable medium having stored thereon machine-readable instructions executable to cause a system to perform operations comprising:
receiving, at a visual dialogue neural network language model, an image input and text input, wherein the text input comprises a dialogue history between the visual dialogue neural network language model and a human user and a current utterance by the human user;
generating, from the image input and text input, using a plurality of visual encoding layers in the visual dialogue neural network language model, an encoded visual dialogue input, wherein the encoded visual dialogue input includes a position level encoding and a segment type encoding;
generating, from the encoded visual dialogue input and using a transformer encoder network in the visual dialogue neural network language model, a unified contextualized representation, wherein the unified contextualized representation includes a token level encoding of the encoded visual dialogue input;
generating, from the unified contextualized representation and using a first self-attention mask associated with discriminative settings of the transformer encoder network or a second self-attention mask associated with generative settings of the transformer encoder network, an answer prediction, wherein the generating comprises setting a first subset of generative settings associated with the second self-attention mask to zero values that allows each token in a context sequence to be visible for attending to each other with one or more attention layers in the transformer encoder network; and
providing the answer prediction as a response to the current utterance of the human user.

16. The non-transitory, machine-readable medium of claim 15, wherein generating the answer prediction comprises:
  masking, at the visual dialogue neural network language model, in a random order, a subset of tokens including special tokens in a text segment of the text input; and
  replacing the subset of tokens including the special tokens with a mask token using masked language modeling.

17. The non-transitory, machine-readable medium of claim 15, further comprising:
  setting a first subset of generative settings associated with the second self-attention mask to zero values that allows each token in a context sequence to be visible for attending to each other with one or more attention layers in the transformer encoder network; and
  setting a second subset of generative settings associated with the second self-attention mask to non-zero values for attending one or more tokens ahead of a subject token in an answer sequence with the one or more attention layers in the transformer encoder network, wherein the second subset is different from the first subset.

18. The non-transitory, machine-readable medium of claim 15, wherein generating the answer prediction comprises:
  generating, by the visual dialogue neural network language model, a prediction indicating a likelihood of whether an appended answer in the text input is correct or not based on the encoded visual dialogue input using a next-sentence prediction (NSP) operation; and
  setting each of a plurality of discriminative settings associated with the first self-attention mask to zero values that allows each token to be visible for attending to each other with one or more attention layers in the transformer encoder network.

* * * * *